US012591197B2

(12) United States Patent
Yamamoto et al.

(10) Patent No.: US 12,591,197 B2
(45) Date of Patent: Mar. 31, 2026

(54) IMAGE FORMING APPARATUS HAVING PLURALITY OF COVERS

(71) Applicant: CANON KABUSHIKI KAISHA, Tokyo (JP)

(72) Inventors: Takanori Yamamoto, Shizuoka (JP); Atsuyoshi Abe, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/908,195

(22) Filed: Oct. 7, 2024

(65) Prior Publication Data

US 2025/0138472 A1 May 1, 2025

(30) Foreign Application Priority Data

Oct. 27, 2023 (JP) ................................ 2023-184922

(51) Int. Cl.

| | |
|---|---|
| ***G03G 21/16*** | (2006.01) |
| ***G03G 15/08*** | (2006.01) |
| ***G03G 21/18*** | (2006.01) |

(52) U.S. Cl.

CPC ..... *G03G 21/1633* (2013.01); *G03G 15/0806* (2013.01); *G03G 21/1814* (2013.01); *G03G 21/1846* (2013.01)

(58) Field of Classification Search

CPC ........... G03G 15/0806; G03G 21/1633; G03G 21/1638; G03G 21/1814; G03G 21/1846

See application file for complete search history.

(56) References Cited

U.S. PATENT DOCUMENTS

| | | | | |
|---|---|---|---|---|
| 11,281,152 | B1 * | 3/2022 | Kokubu | G03G 21/1633 |
| 2024/0255895 | A1 * | 8/2024 | Oguni | G03G 21/206 |
| 2025/0102994 | A1 * | 3/2025 | Chino | G03G 21/1633 |

FOREIGN PATENT DOCUMENTS

| | | | |
|---|---|---|---|
| JP | 2009169433 | A | 7/2009 |
| JP | 2019174691 | A | 10/2019 |
| JP | 2020052359 | A | 4/2020 |
| JP | 2023050032 | A | 4/2023 |

* cited by examiner

*Primary Examiner* — Hoang X Ngo

(74) *Attorney, Agent, or Firm* — Venable LLP

(57) ABSTRACT

An image forming apparatus includes an apparatus body including a first opening, a first cartridge including a developing roller, a second cartridge including a storage portion, a first cover including a second opening, and a second cover. In a case where the first cover is positioned in the first open position and the second cover is positioned in the second open position, a first area of the first opening is opened when viewed in the first direction. A second area is included in the first area. A whole of the second cartridge attached to the first cartridge is disposed in a second area when viewed in the first direction. A portion of the first cartridge attached to the apparatus body is disposed outside the second area when viewed in the first direction.

39 Claims, 7 Drawing Sheets

IMAGE FORMING APPARATUS HAVING PLURALITY OF COVERS

BACKGROUND OF THE INVENTION

Field of the Invention

The present invention relates to an image forming apparatus that forms images on sheets.

Description of the Related Art

Japanese Patent Application Publication No. 2019-174691 proposes an image forming apparatus that includes a casing that includes an opening, a process cartridge that can be detached from the casing through the opening, and first and second covers that are supported by the casing so as to be able to be opened and closed. The process cartridge includes a drum cartridge and a toner cartridge, which can be separated from each other. The first and second covers are front covers that cover the opening of the casing when closed with respect to the casing.

The process cartridge is detached from the casing through the opening in a state where the first and second covers are opened. In a state where the first cover is opened and the second cover is closed, if a user tries to detach the drum cartridge of the process cartridge from the casing, the drum cartridge contacts a projection portion of the second cover. In this manner, the detachment of the drum cartridge from the casing is restricted. However, the toner cartridge can be detached from the drum cartridge without interfering with the projection portion, in a state where the first cover is opened and the second cover is closed.

SUMMARY OF THE INVENTION

According to a first aspect of the present invention, an image forming apparatus configured to form an image on a sheet includes an apparatus body including a first opening, a first cartridge including a developing roller configured to bear toner, the first cartridge being configured to be attached to and detached from the apparatus body through the first opening, a second cartridge including a storage portion configured to store the toner, the second cartridge being configured to be attached to, in a first direction, and be detached from, in a second direction opposite to the first direction, the first cartridge attached to the apparatus body, a first cover supported so as to be opened and closed with respect to the apparatus body, configured to move between a first closed position and a first open position, and including a second opening, the first closed position being a position in which the first cover covers a portion of the first opening, the first open position being a position in which the first cover opens the portion of the first opening, and a second cover configured to move between a second closed position in which the second cover covers the second opening of the first cover positioned in the first closed position and a second open position in which the second cover opens the second opening, the second cover, in the second closed position, overlapping with the first cover positioned in the first closed position when viewed in the first direction, the second cover being disposed downstream of the first cover in the second direction. In a case where the first cover is positioned in the first open position and the second cover is positioned in the second open position, a first area of the first opening is opened when viewed in the first direction. In a case where the first cover is positioned in the first closed position and the second cover is positioned in the second open position, a second area, of the first opening, smaller than the first area is opened through the second opening when viewed in the first direction. The second area is included in the first area. A whole of the first cartridge attached to the apparatus body is disposed in the first area when viewed in the first direction. A whole of the second cartridge attached to the first cartridge is disposed in the second area when viewed in the first direction. A portion of the first cartridge attached to the apparatus body is disposed outside the second area when viewed in the first direction.

According to a second aspect of the present invention, an image forming apparatus configured to form an image on a sheet includes an apparatus body including a first opening, a first cartridge including a developing roller configured to bear toner, the first cartridge being configured to be attached to and detached from the apparatus body through the first opening, a second cartridge including a storage portion configured to store the toner, the second cartridge being configured to be attached to, in a first direction, and be detached from, in a second direction opposite to the first direction, the first cartridge attached to the apparatus body, a first cover supported so as to be opened and closed with respect to the apparatus body, configured to move between a first closed position and a first open position, and including a second opening, the first closed position being a position in which the first cover covers a portion of the first opening, the first open position being a position in which the first cover opens the portion of the first opening, and a second cover configured to move between a second closed position in which the second cover covers the second opening of the first cover positioned in the first closed position and a second open position in which the second cover opens the second opening, the second cover, in the second closed position, overlapping with the first cover positioned in the first closed position when viewed in the first direction, the second cover being disposed downstream of the first cover in the second direction. In a case where the first cover is positioned in the first open position and the second cover is positioned in the second open position, the first cartridge is configured to be detached from the apparatus body through the first opening along the second direction. In a case where the first cover is positioned in the first closed position and the second cover is positioned in the second open position, the second cartridge is configured to be detached from the first cartridge attached to the apparatus body through the second opening of the first cover in the second direction, and the first cartridge is restricted from being detached from the apparatus body by the first cover.

Further features of the present invention will become apparent from the following description of exemplary embodiments with reference to the attached drawings.

DESCRIPTION OF THE EMBODIMENTS

First Embodiment

Overall Configuration

Figure 1A:
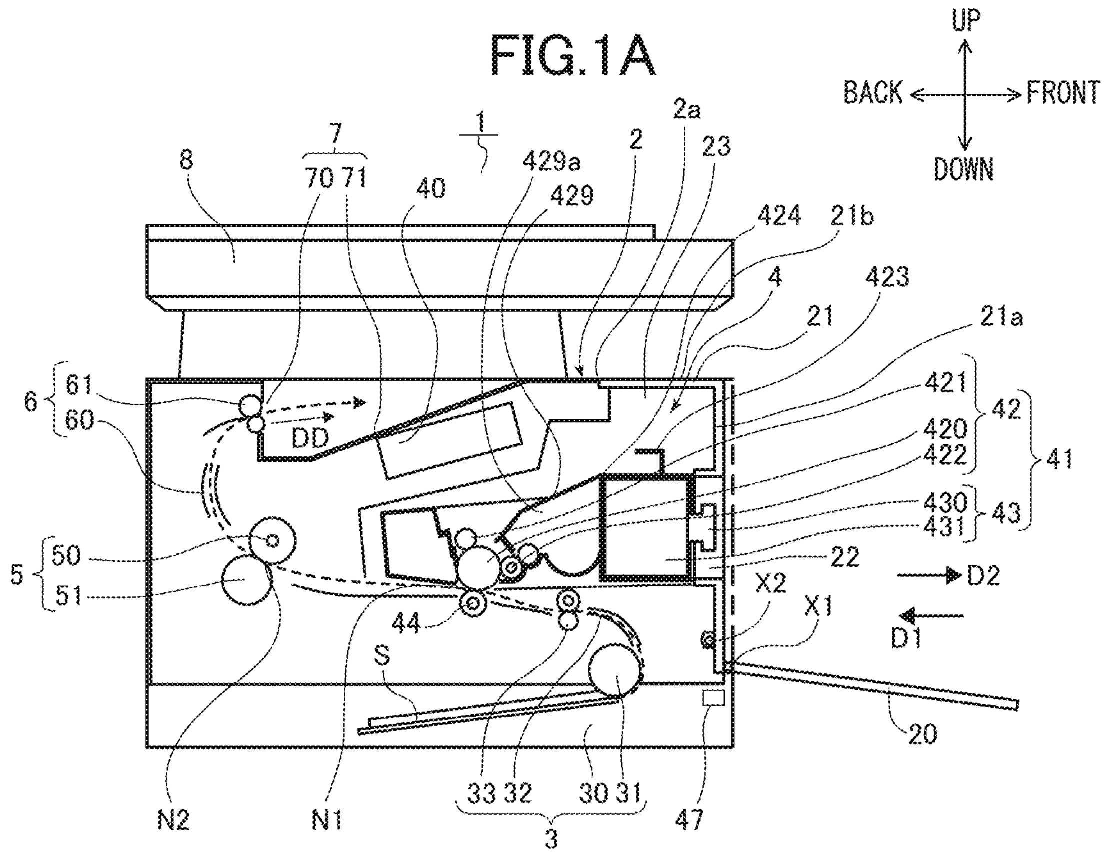
FIG. 1A is an overall schematic diagram illustrating an image forming apparatus of a first embodiment that is in a state where a second cover is opened.
Figure 1B:
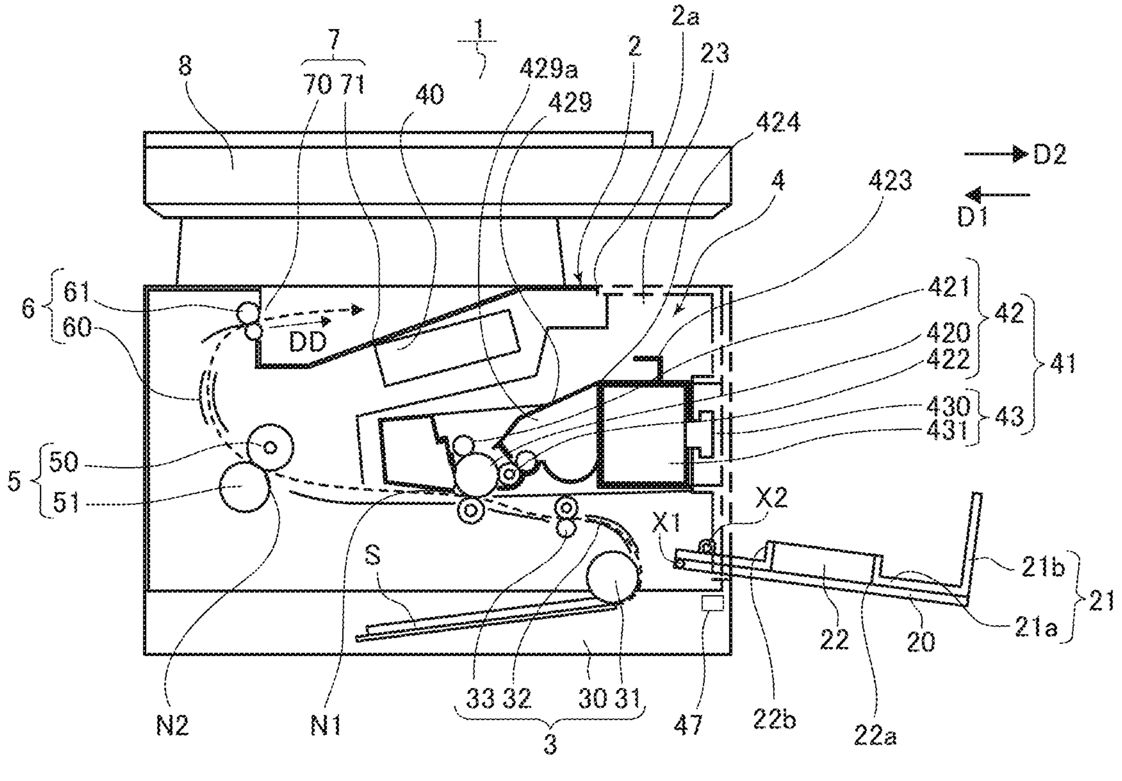
FIG. 1B is an overall schematic diagram illustrating the image forming apparatus that is in a state where a first cover and the second cover are opened.

First, a first embodiment of the present invention will be described. An image forming apparatus 1 that serves as an image forming apparatus is an electrophotographic laser-beam printer that forms monochrome toner images. FIG. 1A is an overall schematic diagram illustrating the image forming apparatus 1 that is in a state where a second cover 20 is opened. FIG. 1B is an overall schematic diagram illustrating the image forming apparatus 1 that is in a state where a first cover 21 and the second cover 20 are opened.

In the following description, each direction is defined, as indicated by an arrow in FIG. 1A. That is, a direction that extends upward in the sheet on which FIG. 1A is shown is defined as an upward direction, a direction that extends downward in the sheet is defined as a downward direction, a direction that extends rightward in the sheet is defined as a front direction or a frontward direction, and a direction that extends leftward in the sheet is defined as a back direction or a backward direction.

As illustrated in FIG. 1A, the image forming apparatus 1 includes a feeder portion 3 that feeds a sheet stacked, and an image forming portion 4 that forms an image on the sheet fed by the feeder portion 3. In addition, the image forming apparatus 1 includes a fixing portion 5 that fixes an image transferred to the sheet, to the sheet; a discharging portion 6 that discharges the sheet to the outside of the image forming apparatus 1; a stacking portion 7; and a document reading unit 8.

Note that examples of the image forming apparatus include a printer, a copying machine, a facsimile, and a multifunction printer; and the image forming apparatus forms images on sheets, used as a recording medium, in accordance with image information sent from an external PC or read from a document. In addition, there is a case in which an apparatus, such as an option feeder, an image reading apparatus, or a sheet processing apparatus, is attached to the body of the image forming apparatus, which has the image forming function. In this case, the whole system in which the apparatus is attached to the body is also a type of the image forming apparatus. In addition, each of the sheet and the document may be a paper sheet, such as a sheet for any purpose or an envelope, a plastic film, such as an overhead projector sheet, a cloth sheet, or the like.

The feeder portion 3 includes a cassette 30 on which a sheet S is stacked, a pickup roller 31 which feeds the sheet S stacked on the cassette 30, a conveyance guide 32, and a conveyance roller pair 33. The conveyance guide 32 guides the sheet S fed by the pickup roller 31, to the conveyance roller pair 33. The conveyance roller pair 33 conveys the sheet S toward a below-described transfer nip N1. Note that the conveyance roller pair 33 may be a registration roller pair that corrects the skew of the sheet S.

The image forming portion 4 includes a laser scanner 40, a process cartridge 41, and a transfer roller 44. The process cartridge 41 is disposed between the laser scanner 40 and the feeder portion 3. The process cartridge 41 includes a drum cartridge 42, and a toner cartridge 43 that can be attached to and detached from the drum cartridge 42.

The drum cartridge 42 that serves as a first cartridge includes a drum frame 429, a photosensitive drum 420, a charging roller 421, and a developing roller 422. The photosensitive drum 420, the charging roller 421, and the developing roller 422 are rotatably supported by the drum frame 429. The photosensitive drum 420 that serves as an image bearing member is in contact with the transfer roller 44. The photosensitive drum 420 and the transfer roller 44 form the transfer nip N1. The drum frame 429 includes a first holding portion 423 which a user can hold for attaching/detaching the drum cartridge 42 to/from an apparatus body 2, an attachment portion 424 to which the toner cartridge 43 is attached, and a toner storage portion 429*a* which can store developer that contains toner. The first holding portion 423 is disposed on the top portion of the drum frame 429. The developing roller 422 bears the toner stored in the toner storage portion 429*a*, and the photosensitive drum 420 is supplied with the toner from the developing roller 422. The drum cartridge 42 can be attached to and detached from the apparatus body 2 in a state where the toner cartridge 43 is not attached to the drum cartridge 42, or where the toner cartridge 43 is attached to the drum cartridge 42 (that is, the drum cartridge 42 serves as the process cartridge 41).

Note that the apparatus body 2 is a portion of the image forming apparatus 1 other than the document reading unit 8, the process cartridge 41, the first cover 21, and the second cover 20. That is, the apparatus body 2 includes the feeder portion 3, the laser scanner 40, the transfer roller 44, the fixing portion 5, the discharging portion 6, and the stacking portion 7.

The toner cartridge 43 that serves as a second cartridge includes a storage portion 431 and a second holding portion 430. The storage portion 431 can store developer that contains toner. The second holding portion 430 projects frontward from the storage portion 431, and a user can hold the second holding portion 430 for attaching/detaching the toner cartridge 43 to/from the drum cartridge 42.

The fixing portion 5 includes a fixing roller 50 and a pressing roller 51. The fixing roller 50 includes a heater (not illustrated). The pressing roller 51 and the fixing roller 50 form a fixing nip N2. The pressing roller 51 is pressed against the fixing roller 50 by a pressing spring (not illustrated). The fixing roller 50 or the pressing roller 51 is driven by a driving source (not illustrated).

The discharging portion 6 includes a discharging guide 60 and a discharging roller pair 61. The discharging guide 60 guides the sheet S conveyed from the fixing nip N2, to the discharging roller pair 61. The discharging roller pair 61 discharges the sheet S to the outside of the image forming apparatus 1, through a discharging opening 70. Specifically, the discharging roller pair 61 discharges the sheet S in a discharging direction DD. The stacking portion 7 includes the discharging opening 70 and a discharging tray 71. The discharging tray 71 is a tray on which the sheet S, discharged to the outside of the image forming apparatus 1 by the discharging roller pair 61, is stacked. The document reading unit 8 can read the image of a document placed on a document platen glass included in the document reading unit 8.

If an image forming instruction is outputted to the image forming apparatus 1, the image forming portion 4 starts an image forming process in accordance with the image information sent from an external computer connected to the image forming apparatus 1 or outputted from the document reading unit 8. The laser scanner 40 emits a laser beam toward the photosensitive drum 420 in accordance with the image information sent from the external computer or outputted from the document reading unit 8. The photosensitive drum 420 is charged in advance by the charging roller 421. Thus, if the photosensitive drum 420 is irradiated with the laser beam, an electrostatic latent image is formed on the photosensitive drum 420. The electrostatic latent image is then developed by the developing roller 422, so that a monochrome toner image is formed on the photosensitive drum 420.

In parallel with the above-described image forming process, the sheet S is fed from the feeder portion 3. The toner image formed on the photosensitive drum 420 is transferred, in the transfer nip N1, onto the sheet S fed from the feeder portion 3, by the electrostatic load bias applied to the transfer roller 44. The sheet S onto which the toner image has been transferred is applied with predetermined heat and pressure in the fixing nip N2, by the fixing roller 50 and the pressing roller 51 of the fixing portion 5, so that the toner is melted and solidified (fixed). The sheet S that has passed through the fixing portion 5 is guided to the discharging roller pair 61 by the discharging guide 60, and is discharged to the discharging tray 71 by the discharging roller pair 61.

Configuration of First Cover and Second Cover

Next, a configuration of each of the first cover 21 and the second cover 20 will be described. As illustrated in FIGS. 1A and 1B, the image forming apparatus 1 includes the first cover 21 and the second cover 20. The first cover 21 is supported so as to be able to be opened and closed with respect to the apparatus body 2. The second cover 20 is supported so as to be able to be opened and closed with respect to the first cover 21. The first cover 21 and the second cover 20 are disposed on the front side (i.e., the front surface side) of the apparatus body 2. In other words, the first cover 21 and the second cover 20 are disposed downstream of the apparatus body 2 in the discharging direction DD. In the present embodiment, the discharging direction DD is a direction along a detachment direction D2.

The first cover 21 can pivot around a shaft X2, and move between a closed position illustrated in FIG. 1A and serving as a first closed position and an open position illustrated in FIG. 1B with a solid line and serving as a first open position. The second cover 20 can pivot around a shaft X1, and move between a closed position illustrated in FIG. 1A with a broken line and serving as a second closed position and an open position illustrated in FIG. 1B with a solid line and serving as a second open position. Since the first cover 21 and the second cover 20 are configured so as to be able to pivot, the number of components of the image forming apparatus 1 can be reduced and the image forming apparatus 1 can be simplified.

Figure 3A:
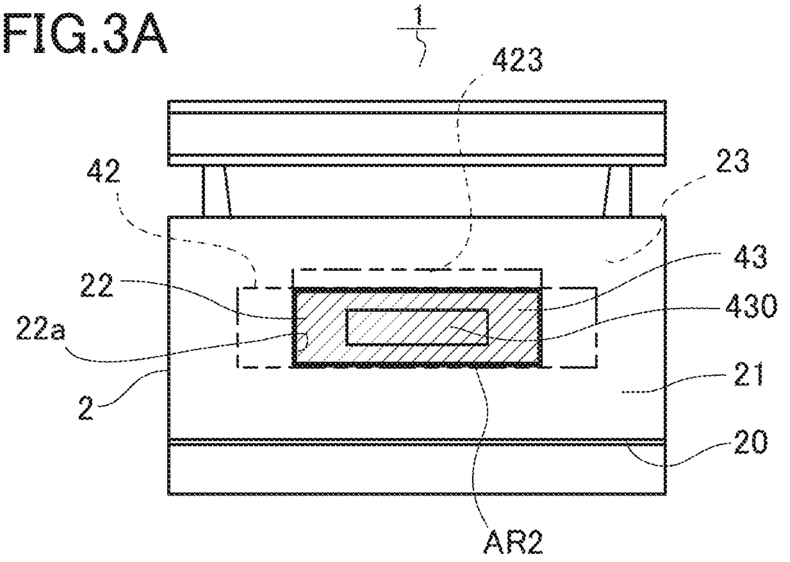
FIG. 3A is a front view illustrating the image forming apparatus that is in a state where the second cover is opened.
Figure 3B:
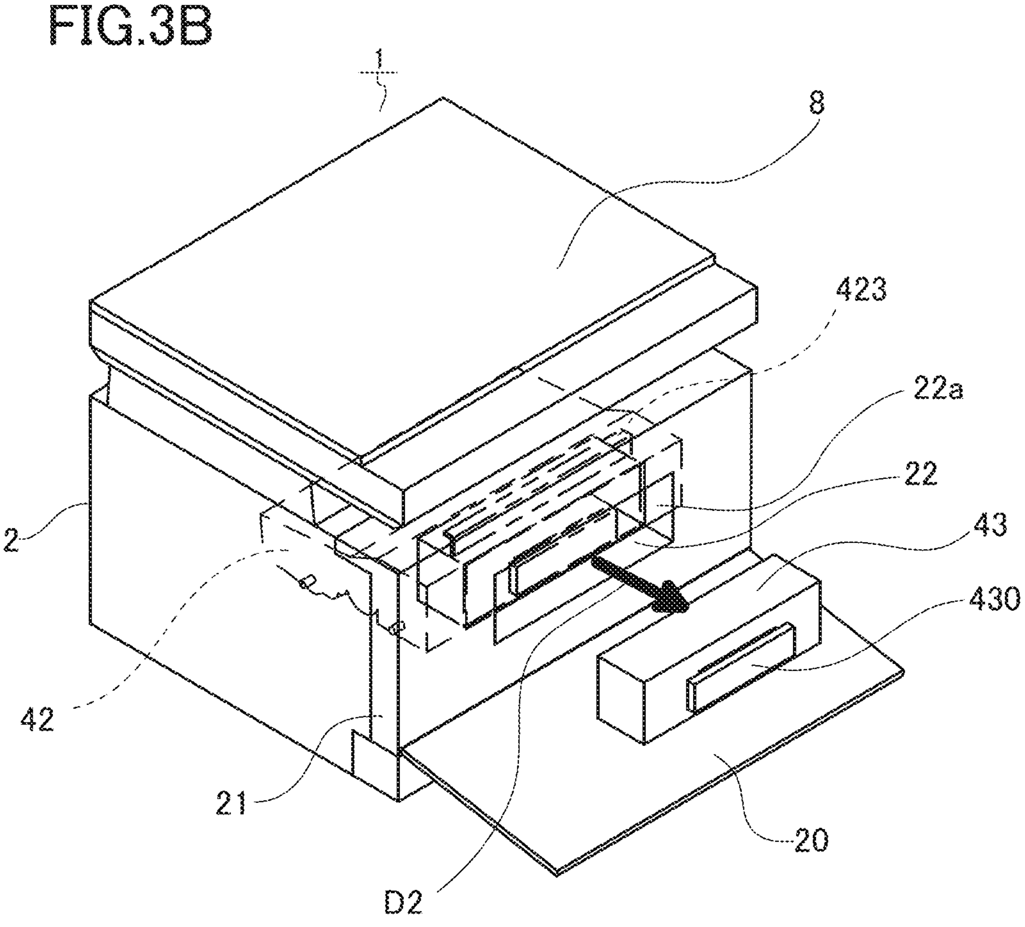
FIG. 3B is a perspective view illustrating the image forming apparatus that is in a state where the second cover is opened.

When positioned in the closed position, the second cover 20 faces the first cover 21 positioned in the closed position, in an attachment direction D1, and is disposed downstream of the first cover 21 in the detachment direction D2. In addition, when positioned in the closed position, the second cover 20 forms the front face of the apparatus body 2. The apparatus body 2 includes an opening 23 serving as a first opening and used for attaching/detaching the process cartridge 41 to/from the apparatus body 2. The first cover 21 covers a portion of the opening 23 in the closed position, and opens a portion of the opening 23 in the open position. As illustrated in FIGS. 3A and 3B, the first cover 21 includes an opening 22 used for attaching/detaching the toner cartridge 43 to/from the drum cartridge 42. The opening 22 that serves as a second opening is formed (defined) by a rectangular hole portion 22*a*. The second cover 20 covers the opening 22 of the first cover 21 in the closed position, and opens the opening 22 of the first cover 21 in the open position.

As described below, the toner cartridge 43 can be attached to the drum cartridge 42 in the attachment direction D1 that serves as a first direction, and can be detached from the drum cartridge 42 in the detachment direction D2 opposite to the attachment direction D1 and serving as a second direction. In addition, the drum cartridge 42 can be attached to the apparatus body 2 along the attachment direction D1, and can be detached from the apparatus body 2 along the detachment direction D2. In the present embodiment, the attachment direction D1 and the detachment direction D2 are directions along the horizontal direction.

As illustrated in FIG. 1B, the first cover 21 includes a flange portion 22*b* formed continuous with the hole portion 22*a*. The flange portion 22*b* extends backward toward the interior of the apparatus body 2 when the first cover 21 is positioned in the closed position.

Attachment and Detachment of Toner Cartridge

Figure 2:
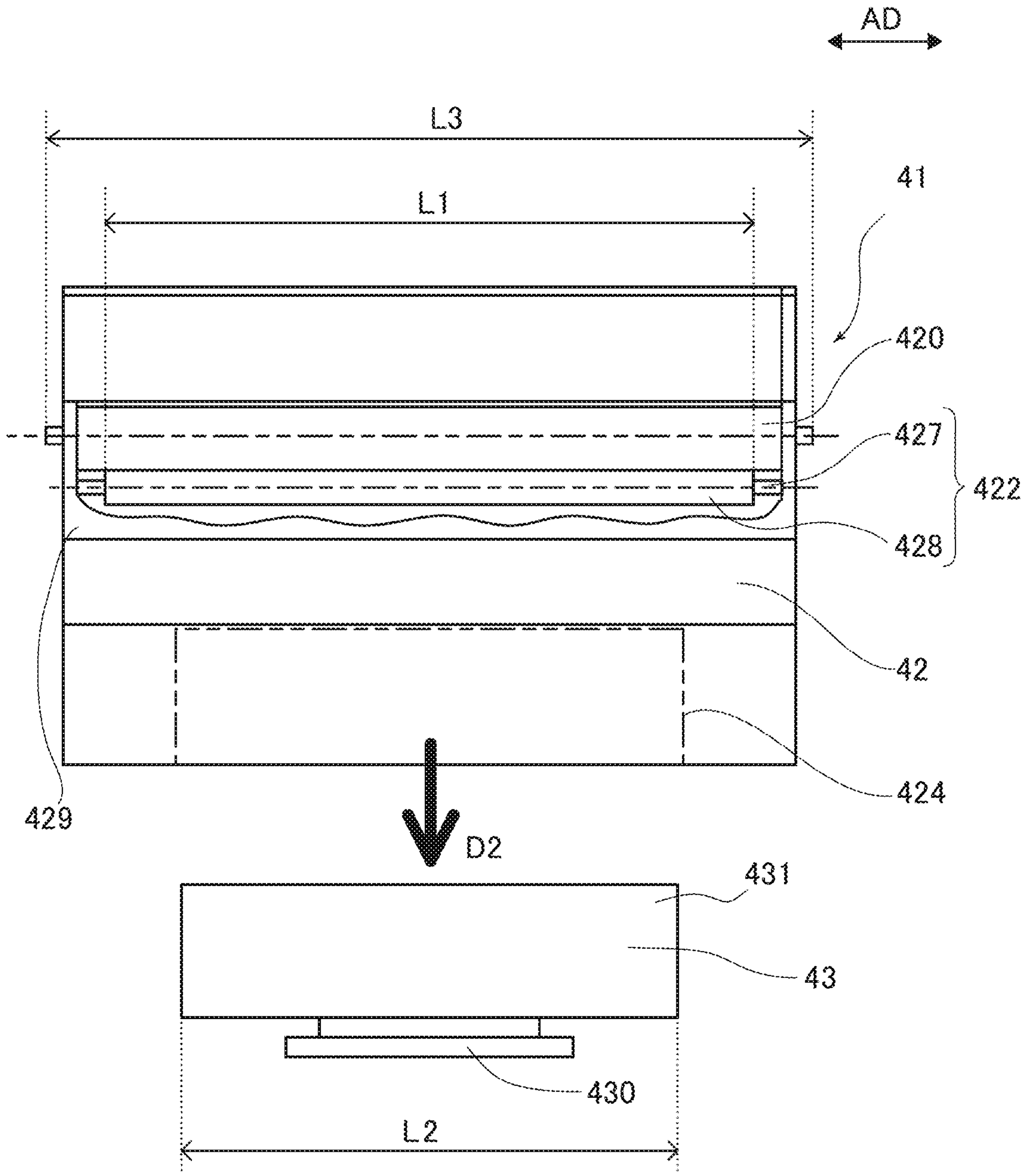
FIG. 2 is a bottom view illustrating a process cartridge.

Next, attachment and detachment of the toner cartridge 43 will be described with reference to FIGS. 1A to 3. FIG. 2 is a bottom view illustrating the process cartridge 41. FIG. 3A is a front view illustrating the image forming apparatus 1 that is in a state where the second cover 20 is opened. FIG. 3B is a perspective view illustrating the image forming apparatus 1 that is in a state where the second cover 20 is opened. Note that in FIG. 2, a portion of the drum frame 429 of the drum cartridge 42 is cut out. FIG. 3A serves also as a diagram in which the image forming apparatus 1 is viewed in the attachment direction D1.

As illustrated in FIG. 2, the developing roller 422 includes a developing shaft portion 427 and a developing roller portion 428. The developing shaft portion 427 serves as a shaft that extends in an axis direction AD, and that is rotatably supported by the drum frame 429. The developing roller portion 428 serves as a roller portion that is fixed to the developing shaft portion 427, and that bears toner. In this configuration, a length L2 of the toner cartridge 43 is shorter than a length L1 of the developing roller portion 428 in the axis direction AD (L2<L1). Similarly, the length L2 of the toner cartridge 43 is shorter than the length of the photosensitive layer of the photosensitive drum 420 and a length L3 of the drum cartridge 42, in the axis direction AD. The lengths L1, L2, and L3 are respectively maximum external dimensions of the developing roller portion 428, the toner cartridge 43, and the drum cartridge 42, in the axis direction AD.

The storage portion 431 of the toner cartridge 43 accommodates a conveyance paddle (not illustrated) that conveys the toner stored in the storage portion 431, toward the developing roller 422 of the drum cartridge 42. Thus, the toner stored in the storage portion 431 of the toner cartridge 43 is supplied to the toner storage portion 429*a* of the drum cartridge 42. Note that the above-described conveyance paddle is driven by the driving force transmitted from the drum cartridge 42.

The toner cartridge 43 attached to the drum cartridge 42 is accommodated in the apparatus body 2 in a state where the drum cartridge 42 is attached to the apparatus body 2, and where the first cover 21 and the second cover 20 are positioned in the closed position.

For detaching the toner cartridge 43 from the drum cartridge 42 attached to the apparatus body 2, a user moves the second cover 20 from the closed position to the open position. Note that the first cover 21 and the second cover 20 are positioned in the closed position, for the image forming apparatus 1 to perform the above-described image forming process. For this reason, the apparatus body 2 includes a switch 47, as illustrated in FIG. 1A. The state of the switch 47 changes from an OFF state to an ON state when the second cover 20 is moved from the closed position to the open position. If the state of the switch 47 changes to the ON state, the image forming apparatus 1 stops or restricts the image forming process and the conveyance operation for the sheet S. Thus, it is possible to prevent the toner cartridge 43 from being detached from the drum cartridge 42 during the image forming process. As a result, the leakage of toner from the toner cartridge 43 or the drum cartridge 42 and the damage of the toner cartridge 43 and the drum cartridge 42 can be prevented.

As illustrated in FIGS. 1A and 3A, if the second cover 20 is moved to the open position, the opening 22 of the first cover 21 positioned in the closed position is opened. In other words, as illustrated in FIG. 3A, in a case where the first cover 21 is positioned in the closed position and the second cover 20 is positioned in the open position, a second area AR2 of the opening 23 of the apparatus body 2 is opened through the opening 22 when viewed in the attachment direction D1. The second area AR2 is a hatched area in FIG. 3A. In addition, the whole of the toner cartridge 43 attached to the drum cartridge 42 is disposed in the second area AR2 when viewed in the attachment direction D1. In other words, the projection area on which the toner cartridge 43 is projected in the attachment direction D1 is smaller than the second area AR2.

Thus, a user can visually recognize the toner cartridge 43 through the opening 22 of the first cover 21. In addition, since the second holding portion 430 of the toner cartridge 43 is disposed on the front surface side of the toner cartridge 43, the second holding portion 430 is exposed to the outside of the apparatus body 2. Thus, the user can also visually recognize the second holding portion 430. As illustrated in FIGS. 2 and 3B, the user can hold the second holding portion 430 and draw the toner cartridge 43 out from the drum cartridge 42 in the detachment direction D2. In other words, the toner cartridge 43 can be detached from the drum cartridge 42 through the opening 22, in the detachment direction D2.

As described above, the flange portion 22*b* is formed on the inner surface of the first cover 21, as illustrated in FIG. 1A. The flange portion 22*b* is disposed closer to the toner cartridge 43 attached to the drum cartridge 42. In addition, the second area AR2 is slightly larger than the above-described projection area of the toner cartridge 43. Thus, when the toner cartridge 43 is drawn out in the detachment direction D2, the toner cartridge 43 is guided toward the detachment direction D2 by the flange portion 22*b*, and can pass smoothly through the opening 22 of the first cover 21. In addition, it is possible to prevent the toner cartridge 43 from abutting against the flange portion 22*b* or the inner surface of the first cover 21. Thus, the toner cartridge 43 can be detached without being blocked.

In addition, for allowing the toner cartridge 43 to pass through the opening 22, a slight clearance is formed between the trajectory, along which the toner cartridge 43 is attached to and detached from the drum cartridge 42, and the hole portion 22*a* and the flange portion 22*b*, which form the opening 22. The flange portion 22*b* extends in the attachment direction D1, and the drum cartridge 42 is disposed downstream of the toner cartridge 43 in the attachment direction D1. That is, the drum cartridge 42 is disposed in a position on the back side of the apparatus body 2 with respect to the opening 22. Thus, a user cannot visually recognize the drum cartridge 42 through the above-described slight clearance, and the drum cartridge 42 is not exposed to the outside of the apparatus body 2.

In other words, the drum cartridge 42 attached to the apparatus body 2 is not exposed to the outside of the apparatus body 2 in a state where the toner cartridge 43 is attached to the drum cartridge 42, where the first cover 21 is positioned in the closed position, and where the second cover 20 is positioned in the open position. Thus, even in a state where the second cover 20 is opened, foreign substance or light hardly enters the interior of the apparatus body 2 from the outside of the apparatus body 2, through the above-described clearance. As a result, the environment in the apparatus body 2 can be kept good, and image defects can be prevented.

In addition, in a case where the first cover 21 is positioned in the closed position and the second cover 20 is positioned in the open position, the first holding portion 423 of the drum cartridge 42 is not exposed to the outside of the apparatus body 2 through the opening 22. Thus, a user cannot visually recognize the first holding portion 423, and can access only the second holding portion 430 of the toner cartridge 43. Thus, the user is not confused about which of the second holding portion 430 of the toner cartridge 43 and the first holding portion 423 of the drum cartridge 42 the user draws out. In addition, since the opening 22 is a hole formed in the first cover 21 by the hole portion 22*a*, the attachment and detachment position of the toner cartridge 43 is made clear, which improves the usability.

In addition, the opening 22 of the first cover 21 has a sufficient size for the toner cartridge 43 to pass through, but the drum cartridge 42 cannot pass through the opening 22. In other words, the drum cartridge 42 is restricted from being detached from the apparatus body 2, by the first cover 21 positioned in the closed position. That is, as illustrated in FIG. 3A, when viewed in the attachment direction D1, a portion of the drum cartridge 42 attached to the apparatus body 2 is disposed outside the second area AR2. Thus, regardless of whether the toner cartridge 43 is attached to the drum cartridge 42, a user can be prevented from mistakenly drawing out the drum cartridge 42 in a state where the first cover 21 is positioned in the closed position. Thus, it can be prevented that the drum cartridge 42 is mistakenly drawn out and collides with the first cover 21. As a result, the damage of the drum cartridge 42 and the first cover 21 can be reduced.

Note that in the present embodiment, a shutter (not illustrated) is disposed in the toner cartridge 43. The shutter is closed when a user starts the drawing operation of the toner cartridge 43, for preventing the toner from leaking and flying from the toner cartridge 43. For example, a locking member that locks the toner cartridge 43 on the drum cartridge 42 may be disposed on the front side (i.e., the opening 22 side) of the toner cartridge 43, and the above-described shutter may be closed by the locking member moving from a locking position to an unlocking position. In another case, the shutter may be closed, based on the operation in which the second cover 20 is moved to the open position and the switch 47 is turned on.

As illustrated in FIG. 3B, the toner cartridge 43 is drawn out from the drum cartridge 42 in the detachment direction D2, and is taken out in the outside of the image forming apparatus 1, through the opening 22. The attachment operation, in which the toner cartridge 43 is attached to the drum cartridge 42 in the attachment direction D1, may be performed in the reverse order to the above-described drawing operation.

Attachment and Detachment of Drum Cartridge

Figure 4:
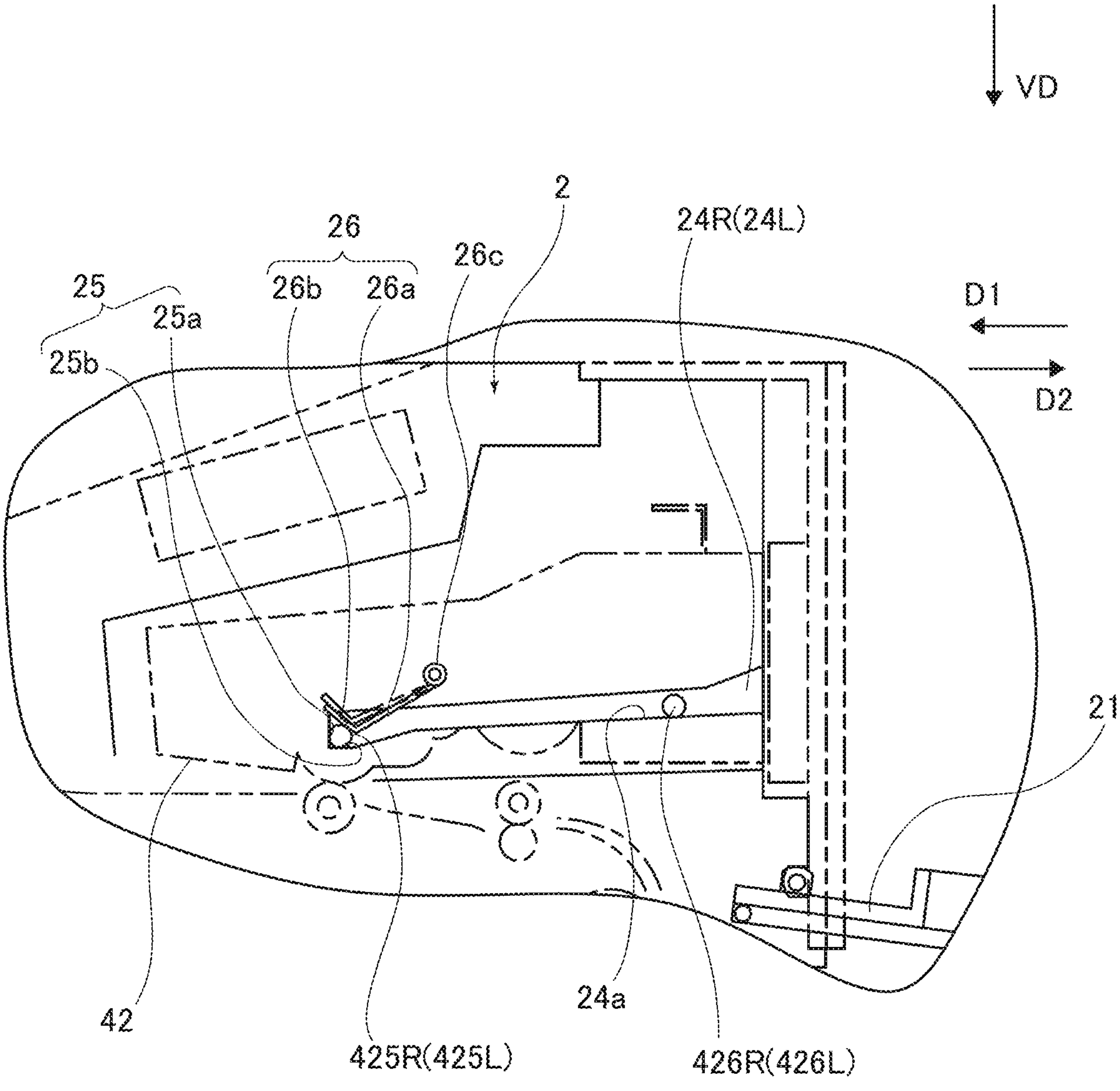
FIG. 4 is a cross-sectional view illustrating a state where a drum cartridge is attached to an apparatus body.
Figure 5A:
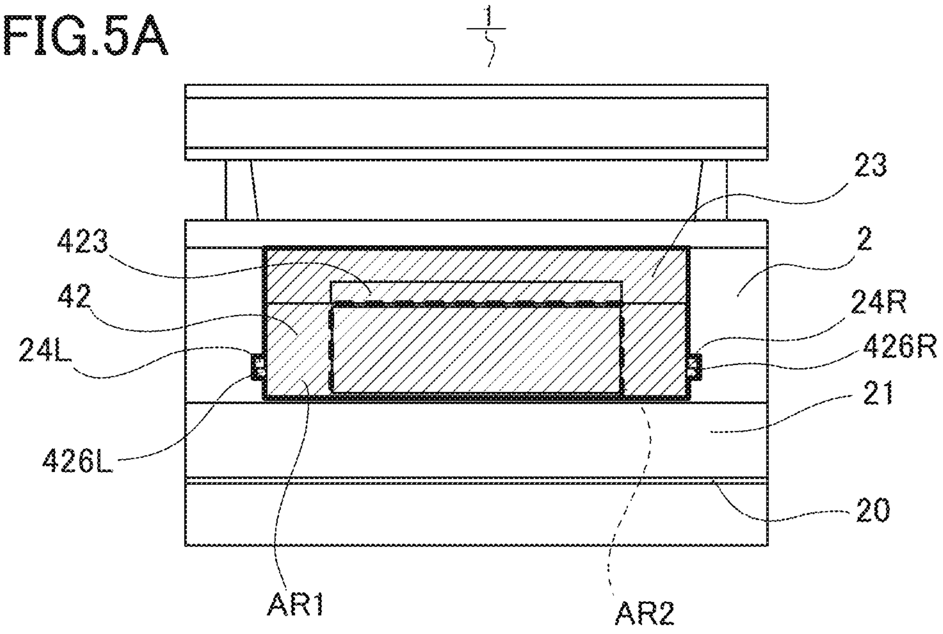
FIG. 5A is a front view illustrating the image forming apparatus that is in a state where each of the first cover and the second cover is positioned in an open position.
Figure 5B:
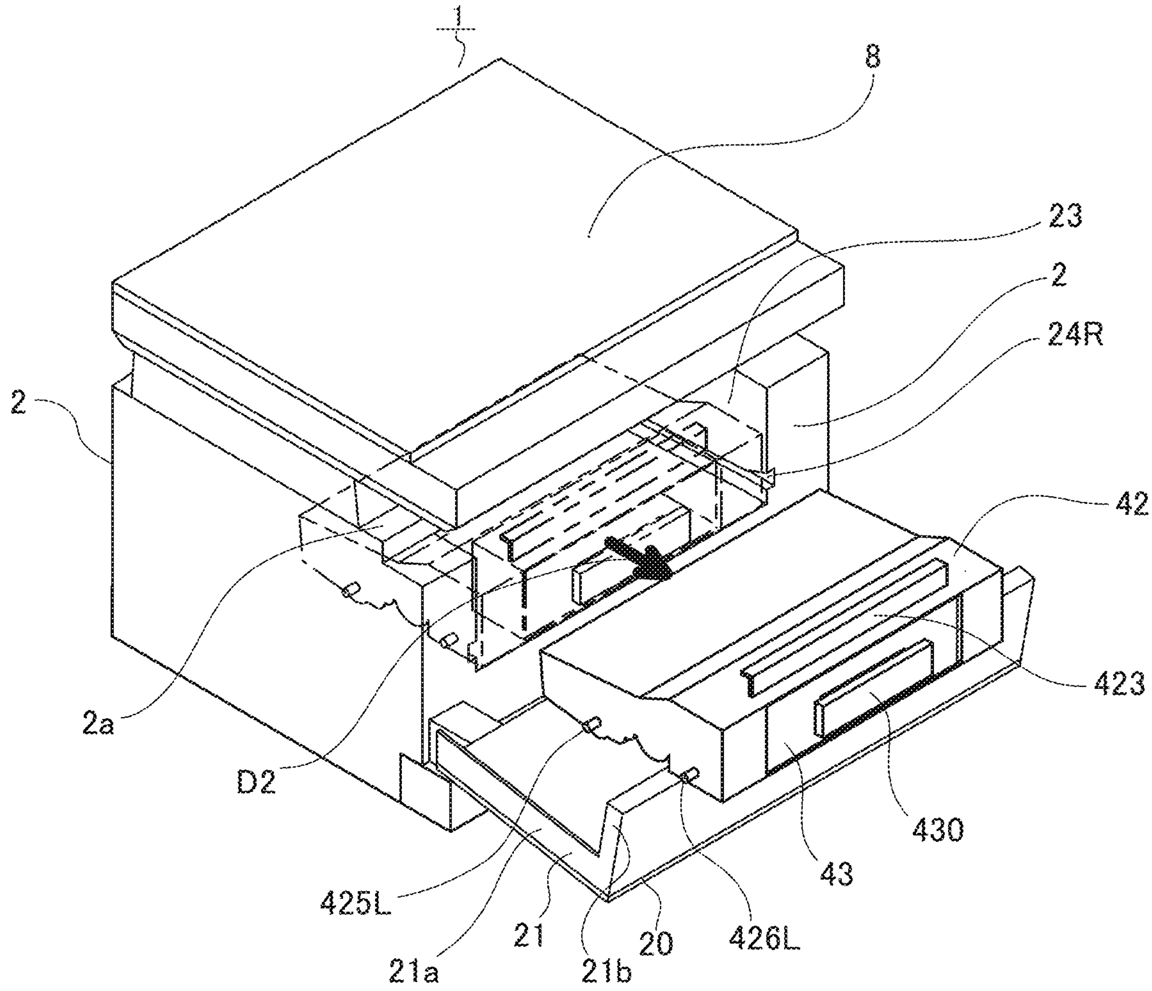
FIG. 5B is a perspective view illustrating the image forming apparatus that is in a state where each of the first cover and the second cover is positioned in the open position.

Next, attachment and detachment of the drum cartridge 42 will be described with reference to FIGS. 4 to 5B. FIG. 4 is a cross-sectional view illustrating a state where the drum cartridge 42 is attached to the apparatus body 2. FIG. 5A is a front view illustrating the image forming apparatus 1 that is in a state where the first cover 21 and the second cover 20 are positioned in the open position. FIG. 5B is a perspective view illustrating the image forming apparatus 1 that is in a state where the first cover 21 and the second cover 20 are positioned in the open position. Note that FIG. 5A serves also as a diagram in which the image forming apparatus 1 is viewed in the attachment direction D1.

In the following description for the attachment and detachment of the drum cartridge 42, the drum cartridge 42 may be in a state where the toner cartridge 43 is attached to the drum cartridge 42 as illustrated in FIG. 5B, or may be in a state where the toner cartridge 43 is detached from the drum cartridge 42. That is, the following description for the attachment and detachment of the drum cartridge 42 holds true also for the attachment and detachment of the process cartridge 41.

As illustrated in FIG. 4 and FIGS. 5A and 5B, groove-shaped guide portions 24L and 24R are formed in the apparatus body 2. In addition, on the left side-surface of the drum cartridge 42, a positioning shaft 425L and a rotation prevention shaft 426L that can engage with the guide portion 24L are disposed. On the right side-surface of the drum cartridge 42, a positioning shaft 425R and a rotation prevention shaft 426R that can engage with the guide portion 24R are disposed. In a state where the drum cartridge 42 is attached to the apparatus body 2, the positioning shaft 425L and the rotation prevention shaft 426L are engaged with the guide portion 24L, and the positioning shaft 425R and the rotation prevention shaft 426R are engaged with the guide portion 24R.

Since the positioning shaft 425L, the rotation prevention shaft 426L, and the guide portion 24L respectively have the same structure as the structure of the positioning shaft 425R, the rotation prevention shaft 426R, and the guide portion 24R, the positioning shaft 425R, the rotation prevention shaft 426R, and the guide portion 24R will be mainly described.

As illustrated in FIG. 4, each of the positioning shaft 425R and the rotation prevention shaft 426R has a boss shape. In a state where the drum cartridge 42 is attached to the apparatus body 2, the positioning shaft 425R is abutted against an abutment portion 25R of the guide portion 24R. The abutment portion 25R includes a first surface 25*a* that extends in a vertical direction VD, and a second surface 25*b* that extends in the detachment direction D2 orthogonal to the vertical direction VD. The positioning shaft 425R is abutted against the first surface 25*a* and the second surface 25*b*.

The apparatus body 2 includes a pressing spring 26R that can pivot around a pivot shaft 26*c*. The pressing spring 26R includes a first line-portion 26*a*, and a second line-portion 26*b* formed so as to bend from the first line-portion 26*a*. The first line-portion 26*a* extends downward more in the vertical direction VD as the first line-portion 26*a* extends toward the attachment direction D1. The second line-portion 26*b* extends upward more in the vertical direction VD as the second line-portion 26*b* extends toward the attachment direction D1.

The second line-portion 26*b* of the pressing spring 26R presses the positioning shaft 425R downward and backward. Thus, the positioning shaft 425R is pressed against the first surface 25*a* and the second surface 25*b* of the abutment portion 25R by the urging force of the pressing spring 26R, so that the drum cartridge 42 is positioned with respect to the apparatus body 2. In addition, the rotation prevention shaft 426R is abutted against a lower surface 24*a* of the guide portion 24R by the self weight of the rotation prevention shaft 426R. Thus, the drum cartridge 42 is restricted from rotating around the positioning shaft 425R because the rotation prevention shaft 426R is abutted against the lower surface 24*a*, so that the drum cartridge 42 can keep a stable posture.

For detaching the drum cartridge 42 from the apparatus body 2, a user moves the second cover 20 and the first cover 21 to the open position, as illustrated in FIGS. 5A and 5B. As a result, the above-described switch 47 is turned on, and the image forming process and the conveyance operation for the sheet S are stopped or restricted. Note that although the switch 47 is turned on, in the present embodiment, when the second cover 20 is moved to the open position, the present disclosure is not limited to this. For example, the switch 47 may be turned on when the first cover 21 is moved to the open position. In another case, the state of the above-described switch 47 may be changed from an ON state to an OFF state. In any case, the opening and closing of the first cover 21 or the second cover 20 has only to be detected by the switch 47.

In addition, in the present embodiment, the second cover 20 is pivotally supported by the first cover 21. Thus, even if a user does not operate the second cover 20, the user can move the second cover 20 to the open position, together with the first cover 21, by moving the first cover 21 to the open position. Thus, the operability can be improved. Note that after moving the second cover 20 to the open position, a user may move the first cover 21 to the open position such that the first cover 21 overlaps with the second cover 20, which has already been positioned in the open position.

If the second cover 20 and the first cover 21 are moved to the open position, the opening 23 of the apparatus body 2 is opened. In other words, as illustrated in FIG. 5A, in a case where the first cover 21 and the second cover 20 are positioned in the open position, a first area AR1 of the opening 23 of the apparatus body 2 is opened when viewed in the attachment direction D1. The first area AR1 is a hatched area in FIG. 5A. In addition, the whole of the drum cartridge 42 attached to the apparatus body 2 is disposed in the first area AR1 when viewed in the attachment direction D1. In other words, the projection area on which the drum cartridge 42 is projected in the attachment direction D1 is smaller than the first area AR1. Note that the above-described second area AR2 is smaller than the first area AR1, and is included in the first area AR1.

As illustrated in FIGS. 1A and 5B, the first cover 21 of the present embodiment includes a first portion 21*a* and a second portion 21*b*. The first portion 21*a* is a portion in which the opening 22 is formed, and which covers a portion of the first area AR1 other than the second area AR2 when the first cover 21 is positioned in the closed position. Each of the first portion 21*a* and the second portion 21*b* is formed like a flat plate. When the first cover 21 is positioned in the closed position, the second portion 21*b* extends from the first portion 21*a* toward the attachment direction D1, and forms a portion of a top surface 2*a* of the apparatus body 2. When the first cover 21 is positioned in the closed position, the second portion 21*b* is positioned so as to overlap with the first holding portion 423 of the drum cartridge 42 when viewed in the vertical direction. That is, the first cover 21 has an L-shaped cross section formed by the first portion 21*a* and the second portion 21*b*, and the second cover 20 is formed like a flat plate.

Thus, as illustrated in FIG. 4, in a state where the second cover 20 and the first cover 21 are positioned in the open position, the first holding portion 423 of the drum cartridge 42 is exposed to the outside of the apparatus body 2 through the opening 23, in the attachment direction D1 and the vertical direction VD. Thus, since a user can visually recognize the first holding portion 423 in both of the attachment direction D1 and the vertical direction VD, the visibility is increased and the user can easily access the first holding portion 423. Thus, the user can hold the first holding portion 423 and draw the drum cartridge 42 out from the apparatus body 2 along the detachment direction D2. In other words, the drum cartridge 42 can be detached from the apparatus body 2 through the opening 23, along the detachment direction D2.

As illustrated in FIG. 4, if a user starts the drawing operation of the drum cartridge 42, the positioning shaft 425R presses the pressing spring 26R toward the detachment direction D2. The second line-portion 26*b* of the pressing spring 26R that is in contact with the positioning shaft 425R is inclined such that the second line-portion 26*b* extends downward more as the second line-portion 26*b* extends in the detachment direction D2. Thus, the positioning shaft 425R pushes the positioning shaft 425R up to a position illustrated by a broken line in FIG. 4. If the positioning shaft 425R passes the bent portion of the pressing spring 26R, the positioning shaft 425R and the rotation prevention shaft 426R are guided along the detachment direction D2 by the guide portion 24R.

If the drum cartridge 42 is further moved in the detachment direction D2 by the user, and the positioning shaft 425R and the rotation prevention shaft 426R pass through the guide portion 24R, the drum cartridge 42 is taken out from the apparatus body 2, as illustrated in FIG. 5B. The attachment operation, in which the drum cartridge 42 is attached to the apparatus body 2 along the attachment direction D1, may be performed in the reverse order to the above-described drawing operation.

As described above, in a state where the second cover 20 is positioned in the open position and the first cover 21 is positioned in the closed position, the toner cartridge 43 is exposed to the outside of the apparatus body 2 through the opening 22 of the first cover 21, but the drum cartridge 42 is not exposed to the outside of the apparatus body 2. In addition, the second holding portion 430 of the toner cartridge 43 is exposed to the outside of the apparatus body 2 through the opening 22 of the first cover 21, but the first holding portion 423 of the drum cartridge 42 is not exposed to the outside of the apparatus body 2.

Thus, in a state where the second cover 20 is positioned in the open position and the first cover 21 is positioned in the closed position, the operation mistake in which a user takes the drum cartridge 42 out from the apparatus body 2 can be prevented. In addition, since a user is not confused about which of the toner cartridge 43 and the drum cartridge 42 the user draws out, the usability can be improved.

In addition, in a state where the first cover 21 and the second cover 20 are positioned in the open position, the drum cartridge 42 is exposed to the outside of the apparatus body 2 through the opening 23 of the apparatus body 2. In particular, the first holding portion 423 of the drum cartridge 42 is exposed to the outside of the apparatus body 2 through the opening 23, in the attachment direction D1 and the vertical direction VD. Thus, a user can easily access the first holding portion 423 and detach the drum cartridge 42 from the apparatus body 2, so that the usability can be improved.

In addition, since both of the drum cartridge 42 and the toner cartridge 43 can be accessed from the front side (i.e., the front surface side) of the image forming apparatus 1, the accessibility can be improved. Furthermore, since both of the drum cartridge 42 and the toner cartridge 43 are attached in the attachment direction D1 and detached in the detachment direction D2, the movement trajectory of the drum cartridge 42 and the movement trajectory of the toner cartridge 43 overlap with each other. Thus, the inner space of the apparatus body 2 can be used effectively, and the space in front of the image forming apparatus 1 and necessary for attaching and detaching the drum cartridge 42 and the toner cartridge 43 can be used effectively. As a result, the work space for the maintenance of the drum cartridge 42 and the toner cartridge 43 can be reduced.

Modification of First Embodiment

Figure 6:
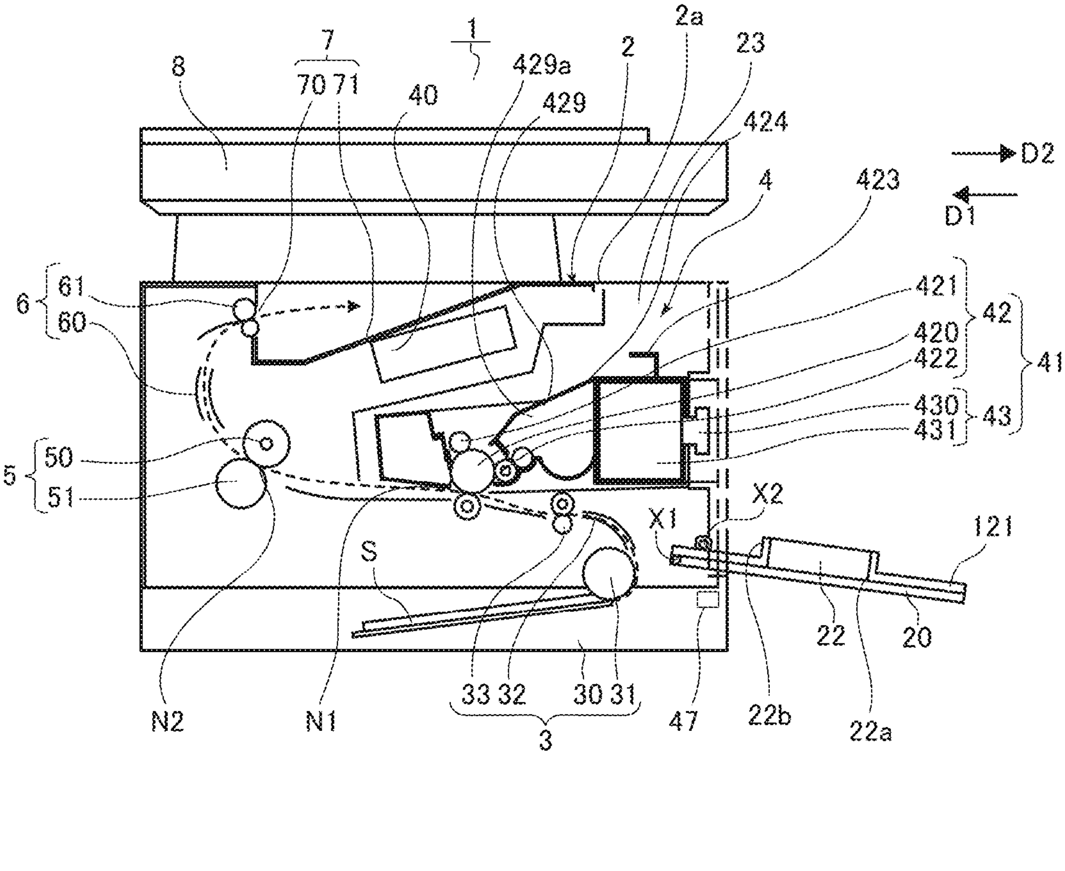
FIG. 6 is an overall schematic diagram illustrating an image forming apparatus of a modification of the first embodiment.

Note that although the first cover 21 of the present embodiment includes the first portion 21*a* and the second portion 21*b* that covers a portion of the top surface 2*a* of the apparatus body 2, the present disclosure is not limited to this. For example, a first cover 121 of a modification illustrated in FIG. 6 may not include the above-described second portion 21*b*. That is, the first cover 121 is formed like a flat plate, like the second cover 20. In the modification illustrated in FIG. 6, the first cover 121 is a cover in which the opening 22 is formed, and which covers a portion of the above-described first area AR1 other than the second area AR2 when the first cover 121 is positioned in the closed position. In this case, an upper portion of the first holding portion 423 of the drum cartridge 42 attached to the apparatus body 2 is covered with the top surface 2*a* of the apparatus body 2, regardless of the position of the first cover 121.

If the first cover 121 is configured as in the present modification, the first cover 121 can be simplified and lightened, and the force for a user to open and close the first cover 121 can be reduced. As a result, the usability can be improved.

Second Embodiment

Next, a second embodiment of the present invention will be described. In the second embodiment, the shape of the first cover 21 of the first embodiment is changed. Thus, the same components as those of the first embodiment are omitted in the drawings, or described with the same symbols given to the drawings.

Figure 7A:
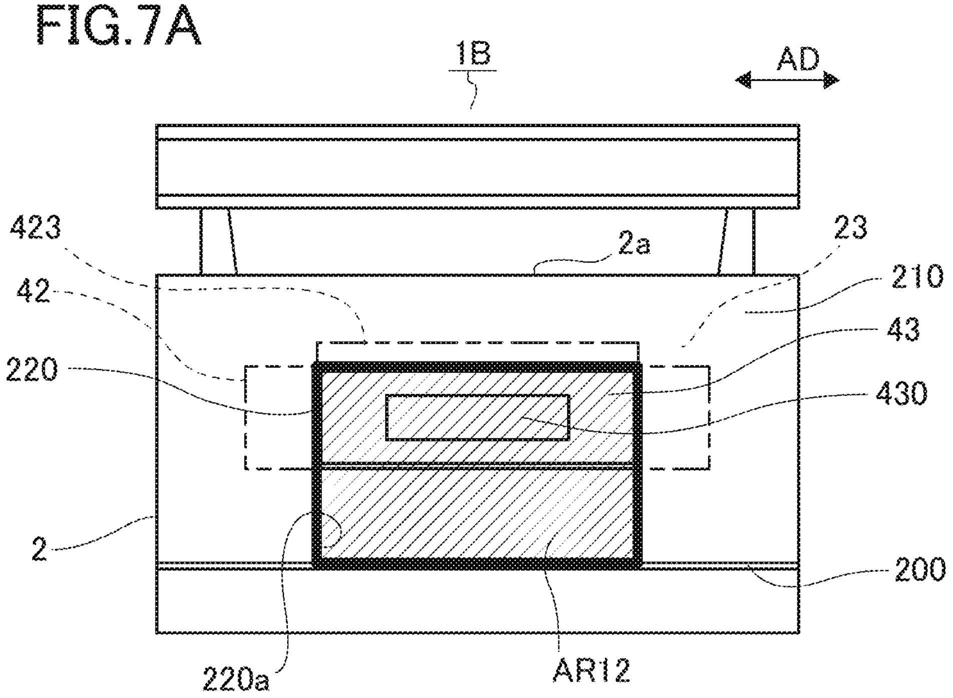
FIG. 7A is a front view illustrating an image forming apparatus of a second embodiment that is in a state where a second cover is positioned in an open position.
Figure 7B:
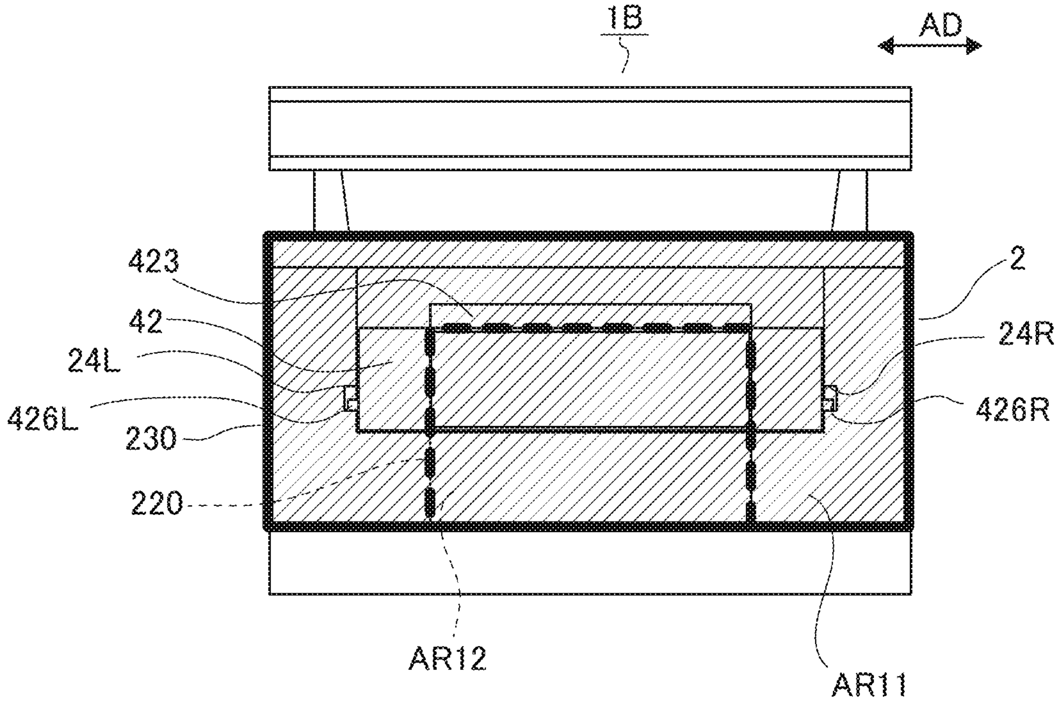
FIG. 7B is a front view illustrating the image forming apparatus that is in a state where each of a first cover and the second cover is positioned in an open position.

FIG. 7A is a front view illustrating an image forming apparatus 1B that is in a state where a second cover 200 of the second embodiment is positioned in an open position. FIG. 7B is a front view illustrating the image forming apparatus 1B that is in a state where each of a first cover 210 and the second cover 200 is positioned in an open position. Note that FIGS. 7A and 7B serve also as diagrams in which the image forming apparatus 1B is viewed in the attachment direction D1.

As illustrated in FIGS. 7A and 7B, each of the first cover 210 and the second cover 200 can pivot around the shaft that extends in the axis direction AD, as in the first embodiment. When viewed in the attachment direction D1, the second cover 200 positioned in the closed position overlaps with the first cover 210 positioned in the closed position. In this case, the second cover 200 is disposed downstream of the first cover 210 in the detachment direction D2.

The first cover 210 covers a portion of the opening 23 of the apparatus body 2 in the closed position, and opens the opening 23 in the open position. As illustrated in FIG. 7A, the first cover 210 includes an opening 220 used for attaching/detaching the toner cartridge 43 to/from the drum cartridge 42. The opening 220 is formed (defined) by a cutout portion 220*a*. The cutout portion 220*a* is formed in a lower portion of the first cover 210, and in a center portion of the first cover 210 in the axis direction AD. The lower portion of the cutout portion 220*a* is opened. The second cover 200 covers the opening 220 of the first cover 210 in the closed position, and opens the opening 220 of the first cover 210 in the open position.

Attachment and Detachment of Toner Cartridge

For detaching the toner cartridge 43 from the drum cartridge 42 attached to the apparatus body 2, a user moves the second cover 200 from the closed position to the open position, as illustrated in FIG. 7A. The state of the switch 47 (see FIG. 1A) changes from an OFF state to an ON state when the second cover 20 is moved from the closed position to the open position. If the state of the switch 47 changes to the ON state, the image forming apparatus 1B stops or restricts the image forming process and the conveyance operation for the sheet S.

If the second cover 200 is moved to the open position, the opening 220 of the first cover 210 positioned in the closed position is opened. In other words, as illustrated in FIG. 7A, in a case where the first cover 210 is positioned in the closed position and the second cover 200 is positioned in the open position, a second area AR12 of the opening 23 of the apparatus body 2 is opened through the opening 220 when viewed in the attachment direction D1. The second area AR12 is a hatched area in FIG. 7A. In addition, the whole of the toner cartridge 43 attached to the drum cartridge 42 is disposed in the second area AR12 when viewed in the attachment direction D1. In other words, the projection area on which the toner cartridge 43 is projected in the attachment direction D1 is smaller than the second area AR12.

Thus, a user can visually recognize the toner cartridge 43 through the opening 220 of the first cover 210. In addition, since the second holding portion 430 of the toner cartridge 43 is disposed on the front surface side of the toner cartridge 43, the second holding portion 430 is exposed to the outside of the apparatus body 2. Thus, the user can also visually recognize the second holding portion 430, and can hold the second holding portion 430 and draw the toner cartridge 43 out from the drum cartridge 42 in the detachment direction D2. In other words, the toner cartridge 43 can be detached from the drum cartridge 42 through the opening 220, in the detachment direction D2.

Note that when the first cover 210 is positioned in the closed position and the second cover 200 is positioned in the open position, the first holding portion 423 of the drum cartridge 42 is not exposed to the outside of the apparatus body 2 through the opening 220. Thus, a user cannot visually recognize the first holding portion 423, and can access only the second holding portion 430 of the toner cartridge 43. Thus, the user is not confused about which of the second holding portion 430 of the toner cartridge 43 and the first holding portion 423 of the drum cartridge 42 the user draws out. In addition, since the opening 220 is an opening formed in the first cover 210 by the U-shaped cutout portion 220*a*, the attachment and detachment position of the toner cartridge 43 is made clear, which improves the usability.

In addition, the opening 220 of the first cover 210 has a sufficient size for the toner cartridge 43 to pass through, but the drum cartridge 42 cannot pass through the opening 220. In other words, the drum cartridge 42 is restricted from being detached from the apparatus body 2, by the first cover 210 positioned in the closed position. That is, as illustrated in FIG. 7A, when viewed in the attachment direction D1, a portion of the drum cartridge 42 attached to the apparatus body 2 is disposed outside the second area AR12. Thus, regardless of whether the toner cartridge 43 is attached to the drum cartridge 42, a user can be prevented from mistakenly drawing out the drum cartridge 42 in a state where the first cover 210 is positioned in the closed position. Thus, it can be prevented that the drum cartridge 42 is mistakenly drawn out and collides with the first cover 210. As a result, the damage of the drum cartridge 42 and the first cover 210 can be reduced.

In addition, the toner cartridge 43 is drawn out from the drum cartridge 42 in the detachment direction D2, and is taken out in the outside of the image forming apparatus 1, through the opening 220. The attachment operation, in which the toner cartridge 43 is attached to the drum cartridge 42 in the attachment direction D1, may be performed in the reverse order to the above-described drawing operation.

Attachment and Detachment of Drum Cartridge

For detaching the drum cartridge 42 from the apparatus body 2, a user moves the second cover 200 and the first cover 210 to the open position, as illustrated in FIG. 7B. If the second cover 200 and the first cover 210 are moved to the open position, the opening 23 of the apparatus body 2 is opened. In other words, in a case where the first cover 210 and the second cover 200 are positioned in the open position, a first area AR11 of the opening 23 of the apparatus body 2 is opened when viewed in the attachment direction D1. The first area AR11 is a hatched area in FIG. 7B. In addition, the whole of the drum cartridge 42 attached to the apparatus body 2 is disposed in the first area AR11 when viewed in the attachment direction D1. In other words, the projection area on which the drum cartridge 42 is projected in the attachment direction D1 is smaller than the first area AR11. Note that the above-described second area AR12 is smaller than the first area AR11, and is included in the first area AR11.

In a state where the second cover 200 and the first cover 210 are positioned in the open position, the first holding portion 423 of the drum cartridge 42 is exposed to the outside of the apparatus body 2 through the opening 23. Thus, a user can easily access the first holding portion 423, and hold the first holding portion 423 and draw the drum cartridge 42 out from the apparatus body 2 along the detachment direction D2. In other words, the drum cartridge 42 can be detached from the apparatus body 2 through the opening 23, along the detachment direction D2.

Since the movement of the pressing spring 26R (see FIG. 4) performed when a user starts the drawing operation of the drum cartridge 42 is the same as that in the first embodiment, the description thereof will be omitted. If the drum cartridge 42 is moved in the detachment direction D2 by a user, and passes through the guide portions 24R and 24L, the drum cartridge 42 is taken out from the apparatus body 2. The attachment operation, in which the drum cartridge 42 is attached to the apparatus body 2 along the attachment direction D1, may be performed in the reverse order to the above-described drawing operation.

As described above, even in a case where the opening 220 of the first cover 210 is formed by the cutout portion 220*a*, the same effects as those of the first embodiment can be produced. In the present embodiment, the first cover 210 is bent and L-shaped, and forms a portion of the top surface 2*a*, as in the first embodiment. However, the present disclosure is not limited to this. For example, the first cover 210 may not include the second portion 21*b* (see FIG. 1A), as in the modification described with reference to FIG. 6.

Other Embodiments

Note that although the first covers, 21 and 210, and the second covers, 20 and 200, can pivot in the above-described embodiments, the present disclosure is not limited to this. For example, the first covers, 21 and 210, and the second covers, 20 and 200, may slide between the open position and the closed position. In the above-described embodiments, the first covers 21 and 210 can pivot around the shaft X2 that extends in parallel with the axis direction AD, and the second covers 20 and 200 can pivot around the shaft X1 that extends in parallel with the axis direction AD. However, the shafts X1 and X2 may not necessarily extend in parallel with the axis direction AD. For example, each of the shafts X1 and X2 may be inclined with respect to the axis direction AD, in a range of ±15. In other words, the first covers 21 and 210 have only to be disposed so as to be able to pivot around a shaft that extends in a third direction that intersects the attachment direction D1, and the second covers 20 and 200 have only to be disposed so as to be able to pivot around a shaft that extends in a fourth direction that intersects the attachment direction D1. Preferably, the third direction and the fourth direction are orthogonal to the attachment direction D1 and parallel with each other. For example, the third direction and the fourth direction may be the axis direction AD of the developing roller 422.

In addition, although the second covers 20 and 200 are supported with respect to the first covers 21 and 210 in the above-described embodiments, the present disclosure is not limited to this. For example, the second covers 20 and 200 may be movably supported by the apparatus body 2. In this configuration, when the second covers 20 and 200 are opened for the replacement of the toner cartridge 43, the first covers 21 and 210 can be prevented from being opened together with the second covers 20 and 200. As a result, the usability can be improved.

In addition, although the description has been made, in any of the above-described embodiments, for the image forming apparatuses 1 and 1B that include the document reading unit 8. However, the present disclosure is not limited to this. For example, the image forming apparatuses 1 and 1B may not include the document reading unit 8.

In any of the above-described embodiments, the first covers, 21 and 210, and the second covers, 20 and 200, are disposed on the front side (i.e., the front surface side) of the apparatus body 2, and the toner cartridge 43 and the drum cartridge 42 are drawn out toward the front side of the apparatus body 2. However, the present disclosure is not limited to this. For example, the first covers, 21 and 210, and the second covers, 20 and 200, may be disposed on the right side-surface side, the left side-surface side, or the back-surface side of the apparatus body 2. In this case, the toner cartridge 43 and the drum cartridge 42 are drawn out toward the right direction, the left direction, or the back direction. Preferably, the attachment-and-detachment direction of the toner cartridge 43 and the attachment-and-detachment direction of the drum cartridge 42 are the same as each other in any of the above-described configurations.

In addition, although the description has been made, in any of the above-described embodiments, for the image forming apparatuses 1 and 1B that are monochrome laser printers. However, the present disclosure is not limited to this. For example, the present invention may be applied to an image forming apparatus that is a full-color laser printer. In this case, the image forming apparatus includes a plurality of (e.g., four colors of yellow, magenta, cyan, and black) process cartridges, and each process cartridge includes the drum cartridge 42 and the toner cartridge 43. In addition, the first covers 21 and 210 may respectively include the openings 22 and 220 that have sufficient size for attaching and detaching the toner cartridge 43.

In any of the above-described embodiments, the toner cartridge 43 can be attached to and detached from the drum cartridge 42. However, the present disclosure is not limited to this. For example, the toner cartridge 43 may be attached to and detached from the developing cartridge that includes the developing roller 422. In this case, the developing cartridge that serves as the first cartridge does not include the photosensitive drum 420, and can be attached to and detached from the apparatus body 2 through the opening 23.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-184922, filed on Oct. 27, 2023, which is hereby incorporated by reference herein in its entirety.

What is claimed is:

1. An image forming apparatus configured to form an image on a sheet, the image forming apparatus comprising:

an apparatus body including a first opening;

a first cartridge including a developing roller configured to bear toner, the first cartridge being configured to be attached to and detached from the apparatus body through the first opening;

a second cartridge including a storage portion configured to store the toner, the second cartridge being configured to be attached to, in a first direction, and be detached from, in a second direction opposite to the first direction, the first cartridge attached to the apparatus body;

a first cover supported so as to be opened and closed with respect to the apparatus body, configured to move between a first closed position and a first open position, and including a second opening, the first closed position being a position in which the first cover covers a portion of the first opening, the first open position being a position in which the first cover opens the portion of the first opening; and a second cover configured to move between a second closed position in which the second cover covers the second opening of the first cover positioned in the first closed position and a second open position in which the second cover opens the second opening, the second cover, in the second closed position, overlapping with the first cover positioned in the first closed position when viewed in the first direction, the second cover being disposed downstream of the first cover in the second direction, wherein in a case where the first cover is positioned in the first open position and the second cover is positioned in the second open position, a first area of the first opening is opened when viewed in the first direction, wherein in a case where the first cover is positioned in the first closed position and the second cover is positioned in the second open position, a second area, of the first opening, smaller than the first area is opened through the second opening when viewed in the first direction, wherein the second area is included in the first area, wherein a whole of the first cartridge attached to the apparatus body is disposed in the first area when viewed in the first direction, wherein a whole of the second cartridge attached to the first cartridge is disposed in the second area when viewed in the first direction, and wherein a portion of the first cartridge attached to the apparatus body is disposed outside the second area when viewed in the first direction.

2. The image forming apparatus according to claim 1, wherein in a case where the first cover is positioned in the first open position and the second cover is positioned in the second open position, the first cartridge is configured to be detached from the apparatus body through the first opening along the second direction, and wherein in a case where the first cover is positioned in the first closed position and the second cover is positioned in the second open position, the second cartridge is configured to be detached from the first cartridge attached to the apparatus body through the second opening of the first cover in the second direction, and the first cartridge is restricted from being detached from the apparatus body by the first cover.

3. The image forming apparatus according to claim 1, wherein the first cartridge includes a first holding portion configured to be held in a case where the first cartridge is attached to and detached from the apparatus body, wherein the second cartridge includes a second holding portion configured to be held in a case where the second cartridge is attached to and detached from the first cartridge, wherein in a case where the first cover is positioned in the first open position and the second cover is positioned in the second open position, the first holding portion is exposed to an outside of the apparatus body through the first opening, and wherein in a case where the first cover is positioned in the first closed position and the second cover is positioned in the second open position, the second holding portion is exposed to the outside of the apparatus body through the second opening of the first cover, and the first holding portion is not exposed to the outside of the apparatus body through the second opening.

4. The image forming apparatus according to claim 1, wherein the first cover includes:

a first portion in which the second opening is formed and which covers a portion of the first area other than the second area in a case where the first cover is positioned in the first closed position; and a second portion which extends from the first portion toward the first direction in a case where the first cover is positioned in the first closed position.

5. The image forming apparatus according to claim 4, wherein the first cover has an L-shaped cross section formed by the first portion and the second portion, and wherein the second cover is formed like a flat plate.

6. The image forming apparatus according to claim 4, wherein the second portion forms a portion of a top surface of the apparatus body in a case where the first cover is positioned in the first closed position.

7. The image forming apparatus according to claim 6, wherein the first cartridge includes a first holding portion configured to be held in a case where the first cartridge is attached to and detached from the apparatus body, and wherein the first holding portion is disposed so as to overlap with the second portion of the first cover when viewed in a vertical direction in a case where the first cover is positioned in the first closed position, and is exposed to an outside of the apparatus body in the vertical direction in a case where the first cover is positioned in the first open position.

8. The image forming apparatus according to claim 1, wherein the first cover is formed like a flat plate, and covers a portion of the first area other than the second area in a case where the first cover is positioned in the first closed position, wherein the first cartridge includes a first holding portion configured to be held in a case where the first cartridge is attached to and detached from the apparatus body, and wherein an upper portion of the first holding portion of the first cartridge attached to the apparatus body is covered by a top surface of the apparatus body, regardless of a position of the first cover.

9. The image forming apparatus according to claim 1, wherein the second cartridge attached to the first cartridge is accommodated in the apparatus body in a state where the first cartridge is attached to the apparatus body, the first cover is positioned in the first closed position, and the second cover is positioned in the second closed position.

10. The image forming apparatus according to claim 1, wherein the first cartridge attached to the apparatus body is not exposed to an outside of the apparatus body in a state where the second cartridge is attached to the first cartridge, the first cover is positioned in the first closed position, and the second cover is positioned in the second open position.

11. The image forming apparatus according to claim 1, wherein the first cover includes a hole portion configured to form the second opening.

12. The image forming apparatus according to claim 1, wherein the first cover is configured to pivot around a shaft that extends in a third direction that intersects the first direction, and wherein the second cover is configured to pivot around a shaft that extends in a fourth direction that intersects the first direction.

13. The image forming apparatus according to claim 12, wherein the third direction is orthogonal to the first direction and is parallel with the fourth direction.

14. The image forming apparatus according to claim 13, wherein the developing roller is configured to rotate around a shaft that extends in a direction parallel with the third direction and the fourth direction.

15. The image forming apparatus according to claim 1, wherein the developing roller includes:

a shaft that extends in a fifth direction; and a roller portion supported by the shaft and configured to bear toner, and wherein a length of the second cartridge is shorter than a length of the roller portion in the fifth direction.

16. The image forming apparatus according to claim 1, further comprising a discharging portion configured to discharge a sheet in a discharging direction, wherein the first cover and the second cover are disposed downstream of the apparatus body in the discharging direction.

17. The image forming apparatus according to claim 16, wherein the discharging direction is a direction along the second direction.

18. The image forming apparatus according to claim 1, wherein the second cover forms a front face of the apparatus body in the second closed position.

19. The image forming apparatus according to claim 1, wherein the first direction and the second direction are directions along a horizontal direction.

20. The image forming apparatus according to claim 1, wherein the first cartridge includes an image bearing member supplied with the toner from the developing roller and configured to bear a toner image.

21. An image forming apparatus configured to form an image on a sheet, the image forming apparatus comprising:

an apparatus body including a first opening;

a first cartridge including a developing roller configured to bear toner, the first cartridge being configured to be attached to and detached from the apparatus body through the first opening;

a second cartridge including a storage portion configured to store the toner, the second cartridge being configured to be attached to, in a first direction, and be detached from, in a second direction opposite to the first direction, the first cartridge attached to the apparatus body;

a first cover supported so as to be opened and closed with respect to the apparatus body, configured to move between a first closed position and a first open position, and including a second opening, the first closed position being a position in which the first cover covers a portion of the first opening, the first open position being a position in which the first cover opens the portion of the first opening; and a second cover configured to move between a second closed position in which the second cover covers the second opening of the first cover positioned in the first closed position and a second open position in which the second cover opens the second opening, the second cover, in the second closed position, overlapping with the first cover positioned in the first closed position when viewed in the first direction, the second cover being disposed downstream of the first cover in the second direction, wherein in a case where the first cover is positioned in the first open position and the second cover is positioned in the second open position, the first cartridge is configured to be detached from the apparatus body through the first opening along the second direction, and wherein in a case where the first cover is positioned in the first closed position and the second cover is positioned in the second open position, the second cartridge is configured to be detached from the first cartridge attached to the apparatus body through the second opening of the first cover in the second direction, and the first cartridge is restricted from being detached from the apparatus body by the first cover.

22. The image forming apparatus according to claim 21, wherein the first cartridge includes a first holding portion configured to be held in a case where the first cartridge is attached to and detached from the apparatus body, wherein the second cartridge includes a second holding portion configured to be held in a case where the second cartridge is attached to and detached from the first cartridge, wherein in a case where the first cover is positioned in the first open position and the second cover is positioned in the second open position, the first holding portion is exposed to an outside of the apparatus body through the first opening, and wherein in a case where the first cover is positioned in the first closed position and the second cover is positioned in the second open position, the second holding portion is exposed to the outside of the apparatus body through the second opening of the first cover, and the first holding portion is not exposed to the outside of the apparatus body through the second opening.

23. The image forming apparatus according to claim 21, wherein the first cover includes:

a first portion in which the second opening is formed and which is formed like a flat plate; and a second portion which extends from the first portion toward the first direction in a case where the first cover is positioned in the first closed position.

24. The image forming apparatus according to claim 23, wherein the first cover has an L-shaped cross section formed by the first portion and the second portion, and wherein the second cover is formed like a flat plate.

25. The image forming apparatus according to claim 23, wherein the second portion forms a portion of a top surface of the apparatus body in a case where the first cover is positioned in the first closed position.

26. The image forming apparatus according to claim 25, wherein the first cartridge includes a first holding portion configured to be held in a case where the first cartridge is attached to and detached from the apparatus body, and wherein the first holding portion is disposed so as to overlap with the second portion of the first cover when viewed in a vertical direction in a case where the first cover is positioned in the first closed position, and is exposed to an outside of the apparatus body in the vertical direction in a case where the first cover is positioned in the first open position.

27. The image forming apparatus according to claim 21, wherein the first cover is formed like a flat plate, wherein the first cartridge includes a first holding portion configured to be held in a case where the first cartridge is attached to and detached from the apparatus body, and wherein an upper portion of the first holding portion of the first cartridge attached to the apparatus body is covered by a top surface of the apparatus body, regardless of a position of the first cover.

28. The image forming apparatus according to claim 21, wherein the second cartridge attached to the first cartridge is accommodated in the apparatus body in a state where the first cartridge is attached to the apparatus body, the first cover is positioned in the first closed position, and the second cover is positioned in the second closed position.

29. The image forming apparatus according to claim 21, wherein the first cartridge attached to the apparatus body is not exposed to an outside of the apparatus body in a state where the second cartridge is attached to the first cartridge, the first cover is positioned in the first closed position, and the second cover is positioned in the second open position.

30. The image forming apparatus according to claim 21, wherein the first cover includes a hole portion configured to form the second opening.

31. The image forming apparatus according to claim 21, wherein the first cover is configured to pivot around a shaft that extends in a third direction that intersects the first direction, and wherein the second cover is configured to pivot around a shaft that extends in a fourth direction that intersects the first direction.

32. The image forming apparatus according to claim 31, wherein the third direction is orthogonal to the first direction, and is parallel with the fourth direction.

33. The image forming apparatus according to claim 32, wherein the developing roller is configured to rotate around a shaft that extends in a direction parallel with the third direction and the fourth direction.

34. The image forming apparatus according to claim 21, wherein the developing roller includes:

a shaft that extends in a fifth direction; and a roller portion supported by the shaft and configured to bear toner, and wherein a length of the second cartridge is shorter than a length of the roller portion in the fifth direction.

35. The image forming apparatus according to claim 21, further comprising a discharging portion configured to discharge a sheet in a discharging direction, wherein the first cover and the second cover are disposed downstream of the apparatus body in the discharging direction.

36. The image forming apparatus according to claim 35, wherein the discharging direction is a direction along the second direction.

37. The image forming apparatus according to claim 21, wherein the second cover forms a front face of the apparatus body in the second closed position.

38. The image forming apparatus according to claim 21, wherein the first direction and the second direction are directions along a horizontal direction.

39. The image forming apparatus according to claim 21, wherein the first cartridge includes an image bearing member supplied with the toner from the developing roller and configured to bear a toner image.

* * * * *